United States Patent
Gross (10) Patent No.: US 11,214,176 B2
(45) Date of Patent: Jan. 4, 2022

(54) RAIL COVERING FOR A SLIDING SEAT RAIL BETWEEN TWO PASSENGER SEATS IN A CABIN OF A VEHICLE

(71) Applicant: Airbus Operations GmbH, Hamburg (DE)

(72) Inventor: Claus-Peter Gross, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 365 days.

(21) Appl. No.: 16/377,694

(22) Filed: Apr. 8, 2019

(65) Prior Publication Data

US 2019/0308526 A1     Oct. 10, 2019

(30) Foreign Application Priority Data

Apr. 9, 2018 (DE) .......................... 102018108296.7

(51) Int. Cl.
  *B60N 2/07* (2006.01)
  *B64D 11/06* (2006.01)

(52) U.S. Cl.
  CPC ........ *B60N 2/0725* (2013.01); *B64D 11/0696* (2013.01)

(58) Field of Classification Search
  CPC .......................... B60N 2/0725; B64D 11/0696
  USPC ..................................................... 297/463.1
  See application file for complete search history.

(56) References Cited

U.S. PATENT DOCUMENTS

| | | | | |
|---|---|---|---|---|
| 5,188,329 A | * | 2/1993 | Takahara | B60N 2/0705 248/345.1 |
| 5,209,447 A | * | 5/1993 | Yokota | F16C 29/082 248/429 |
| 7,172,155 B2 | * | 2/2007 | Feist | B60N 2/06 174/70 R |
| 7,191,981 B2 | | 3/2007 | Laib et al. | |
| 8,393,590 B2 | | 3/2013 | Kato et al. | |

(Continued)

FOREIGN PATENT DOCUMENTS

| | | | | |
|---|---|---|---|---|
| DE | 102010049104 A1 | | 4/2012 | |
| DE | 102012108982 A1 | * | 3/2014 | ............. B60N 2/015 |

(Continued)

OTHER PUBLICATIONS

German Search Report from German Patent Application No. 102018108296.7 dated Aug. 31, 2018.

*Primary Examiner* — Milton Nelson, Jr.
(74) *Attorney, Agent, or Firm* — Greer, Burns & Crain, Ltd.

(57) ABSTRACT

A rail covering for a sliding seat rail between two passenger seats in a cabin of a vehicle has a first and a second elongate covering element. The first and second covering elements are formed complementary with respect to each other, allowing the first covering element to telescopically engage with a lower side of the second covering element. The first covering element has, at least in regions on a lower side, a first guide which displaceably holds the first covering element on the sliding seat rail along the main direction of extent thereof. The second covering element has an open end arranged on the end side and, at an end arranged oppositely on the end side on a lower side, has a second guide which displaceably holds the second covering element on the sliding seat rail along the main direction of extent thereof.

12 Claims, 4 Drawing Sheets

(56) References Cited

U.S. PATENT DOCUMENTS

| | | | |
|---|---|---|---|
| 2005/0242604 A1* | 11/2005 | Bonnes | B60N 2/0818 |
| | | | 296/35.1 |
| 2005/0247820 A1 | 11/2005 | Feist et al. | |
| 2014/0349042 A1 | 11/2014 | Schomacker | |
| 2015/0145298 A1 | 5/2015 | Wottke et al. | |
| 2016/0101868 A1* | 4/2016 | Daouk | B60N 2/0725 |
| | | | 297/463.1 |
| 2017/0341756 A1 | 11/2017 | Fuerstenberg | |
| 2020/0307417 A1* | 10/2020 | Ornan | B60R 16/027 |

FOREIGN PATENT DOCUMENTS

| | | |
|---|---|---|
| DE | 102013105418 A1 | 12/2014 |
| DE | 102016110022 A1 | 11/2017 |

\* cited by examiner

RAIL COVERING FOR A SLIDING SEAT RAIL BETWEEN TWO PASSENGER SEATS IN A CABIN OF A VEHICLE

CROSS-REFERENCES TO RELATED APPLICATIONS

This application claims the benefit of the German patent application No. 102018108296.7 filed on Apr. 9, 2018, the entire disclosures of which are incorporated herein by way of reference.

FIELD OF THE INVENTION

The invention relates to a rail covering for a sliding seat rail between two passenger seats in a cabin of a vehicle.

BACKGROUND OF THE INVENTION

In vehicles which serve for transporting passengers, floor rails are often used for fastening passenger seats and other fittings in a variable position. In addition, it is known, in particular in aircraft, in accordance with demand or temporary requirements, to determine a distance between seats following one another in a longitudinal direction and optionally occasionally or regularly changing the distance. For this purpose, locking devices of relevant seats are released, the seats are then displaced along the floor rail, and the locking devices are locked again. Changing the distance, in particular between two passenger seats arranged one behind the other, can change the seating category of the relevant section in the passenger cabin. It is known to use sliding guides with guide rails for making the displaceability easier.

In order to protect seat rails and/or sliding rails from soiling and mechanical impairment and in order to visually conceal such a rail system, use is made of coverings which extend on the relevant rail between the passenger seats. It is furthermore known to use telescopic coverings which are changeable in length to a certain extent.

For example, DE 10 2016 110 022 A1 discloses a seat rail system for a cabin of a vehicle, in which use is made of telescopic, length-variable rail coverings which have two mutually overlapping partial sections which are displaceable with respect to each other.

SUMMARY OF THE INVENTION

For the use of abovementioned rail coverings, their position and length always have to be adapted. While the position is easily changeable by removing and inserting the rail covering, the change in length can be carried out only to a certain degree. If pronounced displacement movements of passenger seats are required, in the case of telescopic rail coverings, the individual partial sections would easily slide apart and would require a complicated insertion of the partial sections into each other.

Accordingly, it is an object of the invention to propose a rail covering for a sliding seat rail in a cabin of a vehicle, in which an adapted covering of a guide rail can be realized as simply as possible and in particular without manual interaction with a user.

A rail covering for a sliding seat rail between two passenger seats in a cabin of a vehicle is proposed, the rail covering having a first elongate covering element and a second elongate covering element, wherein the first covering element and the second covering element are formed in a complementary manner with respect to each other, and therefore, the first covering element can be brought telescopically into engagement with a lower side of the second covering element, wherein the first covering element has, at least in regions on a lower side, a first guide means which is designed to hold the first covering element on the sliding seat rail so as to be displaceable along the main direction of extent thereof, and wherein the second covering element has an open end arranged on the end side and, at an end arranged oppositely on the end side on the lower side, has a second guide means which is designed to hold the second covering element on the sliding seat rail so as to be displaceable along the main direction of extent thereof.

As mentioned above, a sliding seat rail on which passenger seats can be held in a displaceable manner is a base for the rail covering according to the invention. The detailed construction of the sliding seat rail is not specifically of importance for the consideration of the features essential to the invention. On the contrary, the rail covering according to the invention is intended to be suitable for any type of seat rails, whether conventional seat rails referred to as a "Douglas rail" or dedicated seat rails provided with a sliding profile. For displaceable passenger seats, the aim is to be able to provide a possibility of being able to attach easily adaptable coverings to the respective sliding seat rail to protect against soiling.

The rail covering according to the invention has two essential elements called first covering element and second covering element. The two covering elements are realized as elongate components which can be placed onto seat rails and are telescopic by means of a complementary design with respect to each other. It is provided here that the first covering element can be brought into engagement with a lower side of the second covering element. Consequently, the first covering element can be introduced or pushed into a corresponding recess or a corresponding profile on the lower side of the second covering element and can form a variable length together with the second covering element.

The covering elements are dimensioned in such a manner that they have a width suitable for covering the sliding seat rail and can preferably extend from a floor located to the side of the sliding seat rail over the sliding seat rail to a floor on the opposite side. As a result, the sliding seat rail is completely protected from soiling and mechanical damage from being stepped on or from the handling of luggage.

The first covering element has the particular feature that a first guide means is arranged on the lower side thereof, the guide means being designed to hold the first covering element on the sliding seat rail so as to be displaceable along the main direction of extent thereof. The sliding seat rail can have a profile which projects into a cabin, i.e., in a direction facing away from the floor and is suitable for producing a sliding guide with a corresponding fastening element. The fastening element can be, for example, a carriage which engages in the profile of the sliding seat rail and, for this purpose, has a suitably shaped recess. The first covering element can likewise be adapted to the profile to the extent that the first guide means is oriented with the first guide means on the sliding seat rail in order to be displaceable exclusively along the main direction of extent of the seat rail. The advantage is that, by this means, the first covering element even irrespective of an engagement with the second covering element has a spatially precisely defined orientation which would permit the introduction of the first covering element into the second covering element.

In a manner corresponding thereto, the second covering element is provided with a second guide means which, however, is arranged at an end-side end which faces away from an end-side open end. The second guide means orients the second covering element relative to the seat rail, and therefore the open end of the covering element is always oriented irrespective of an engagement with the first covering element.

In this connection, it is mentioned that the individual covering elements are each connected to a fitted element which is to be displaced and is arranged on the sliding seat rail. For this purpose, the covering elements can each have a flange which faces away from the respective free end. The fitted elements can be, in particular, passenger seats, wherein the rail covering is provided to cover that part of the sliding seat rail which is located between two passenger seats. If, within the scope of reconfiguring a cabin, passenger seats are displaced to other fitted positions, the covering elements fastened thereto follow the displacement movement. The above-explained configuration according to the invention means that the rail covering does not prevent such a movement and the first covering element can easily slide out of a second covering element. However, in this state, the covering elements always remain oriented in such a manner that a first covering element is subsequently easily and automatically inserted again into a second covering element as soon as the two covering elements meet each other again during a further displacement operation.

In order to maintain sufficient dimensional stability assisting the exact orientation of the two covering elements, a configuration of the covering elements from a metallic material is advantageous. In addition, this ensures a high tread resistance in order to counteract damage to the rail covering during the customary operation of the vehicle. It would nevertheless be conceivable to use a plastic which could optionally also be fiber-reinforced. It could furthermore be expedient here to realize greater wall thicknesses in comparison to a realization with a metallic material.

In an advantageous embodiment, the guide means has two web-like, spaced-apart projections which are arranged along a longitudinal axis of the relevant covering element. The guide means can be both the first guide means and the second guide means. Since the two guide means are in engagement with the same sliding seat rail, the two guide means are introduced to be formed thereon or in a very similar manner. The second guide means could have a somewhat greater extent from the lower side of the second covering element since the second covering element can have slightly larger dimensions to ensure the insertion of the first covering element. The vertical distance taken up by an upper surface with respect to the sliding seat rail can, in particular, be somewhat greater, and therefore the second guide means is intended to compensate for the somewhat greater distance.

Particularly preferably, the distance of the projections from each other is not constant, wherein the projections have a bulge at least in regions transversely with respect to the longitudinal axis. Consequently, in a profile cross section in a plane perpendicular to the main direction of extent of the relevant covering element, a distance of the two projections from each other could be greater in one region than in other regions. The shape of the projections is preferably continuous and constant, and therefore there are no graduations with sharp edges, but rather an overall rounded configuration. For example, the two projections can be formed partially as a circular arc or as a similarly curved shape, with the radius of the circular arc or of the similar curvature being parallel to the main axis of extent. The projections are consequently shell-like, elongate bodies which can engage around a profile of a sliding seat rail.

The first covering element preferably has a first bell-shaped or hood-shaped profile cross section which is formed perpendicularly to the longitudinal axis of the covering element. The first profile cross section therefore essentially has two limbs which are each free on one side and are connected to each other on the opposite side by a web. The limbs are preferably arranged symmetrically with respect to each other. Furthermore, they preferably extend only to one side of the web. Consequently, the sliding seat rail can be arranged in the space formed between the limbs and the web and can be covered by the first covering element. The limbs can extend outward from the web perpendicularly or preferably with a widening shape. In addition, a curvature of the limbs can be taken into consideration for the harmonious appearance, and therefore the limbs adjoin the web in continuous form. In addition, the first guide means can be located exclusively below the web. If the first covering element is trodden on, the resulting load can be transmitted directly through the web onto the first guide means which is supported on the sliding seat rail.

Particularly preferably, the second covering element has a second bell-shaped or hood-shaped profile cross section which is formed perpendicularly to the longitudinal axis of the covering element, wherein longitudinal edges of the second profile cross section each have an inwardly directed fold which forms a gap for the insertion of the first covering element. The second covering element is therefore basically very similar to the first covering element. In order to receive the first covering element on a lower side of the second covering element, folds which each form a gap are arranged on end edges on both sides. It goes without saying that the gaps are dimensioned in such a manner that a first covering element can be inserted into the second covering element.

The second guide means has an extent along the lower side of the second covering element, along the longitudinal axis thereof, the extent corresponding to at least one tenth of the extent of the second covering element along the longitudinal axis thereof. A relatively short second guide means can suffice to achieve guidance along the sliding seat rail, and therefore the space present on the lower side of the second covering element can be readily used by a first covering element. A minimum size of the extent of 10% can prove advantageous for this purpose.

The extent of the second guide means could preferably correspond at most to a quarter of the extent of the second covering element along the longitudinal axis thereof. Sufficient space is therefore provided for receiving the first covering element.

It is pointed out in this connection that the covering elements should be adapted in their dimensions in such a manner that, with a rail covering resulting therefrom, a sliding seat rail between passenger seats with customary seat distances of at least 26 inches (approximately 66 cm) to 40 inches (approximately 1 m) and, in particular, of at least 29 inches (approximately 74 cm) to 36 inches (approximately 91 cm) can be covered.

The first guide means can have an extent along the lower side of the first covering element along the longitudinal axis thereof, the extent substantially corresponding to the extent of the lower side of the first covering element along the longitudinal axis thereof. Since the first covering element does not have to receive any further structural element, the entire lower side of the first covering element can be used for the first guide means. The first guide means does not inevitably have to run continuously along the lower side, but rather can also be interrupted in places.

As explained above, for the movement of the covering elements, the first covering element and the second covering element can each have a flange, which faces away from the lower side, for the fastening to a fitted element.

The flange of the second covering element is preferably arranged above the second guide means, and therefore the space taken up by the first covering element lies at the opposite end.

The invention furthermore relates to a passenger seat system for a cabin of a vehicle, the passenger seat system having a plurality of passenger seat devices each having a seat frame, and a rail system with at least two spaced-apart sliding seat rails running parallel to one another, wherein the seat frame has two pairs of spaced-apart seat legs which are each connected to a fastening element, wherein the fastening elements are in engagement with the sliding seat rails, and wherein the sliding seat rail between two passenger seat devices arranged one behind the other is covered with a rail covering explained above.

As already explained above, in the case of the passenger seat system, the sliding seat rails can be realized as separate guide rails which are fastened to seat rails which are arranged in a floor of a cabin of the vehicle. A simple retrofitting solution is thereby produced.

Finally, the invention relates to a vehicle with a cabin, a cabin floor and at least one passenger seat system of this type.

The vehicle is preferably an aircraft, in particular, a commercial aircraft.

BRIEF DESCRIPTION OF THE DRAWINGS

Further features, advantages and possible uses of the present invention will emerge from the following description of the exemplary embodiments and from the figures. Here, all of the features described and/or illustrated in the figures, individually and in any desired combination, form the subject matter of the invention even independently of their composition in the individual claims or the back-references thereof. Furthermore, in the figures, the same reference signs are used for identical or similar objects.

DETAILED DESCRIPTION OF THE PREFERRED EMBODIMENTS

Figure 1:
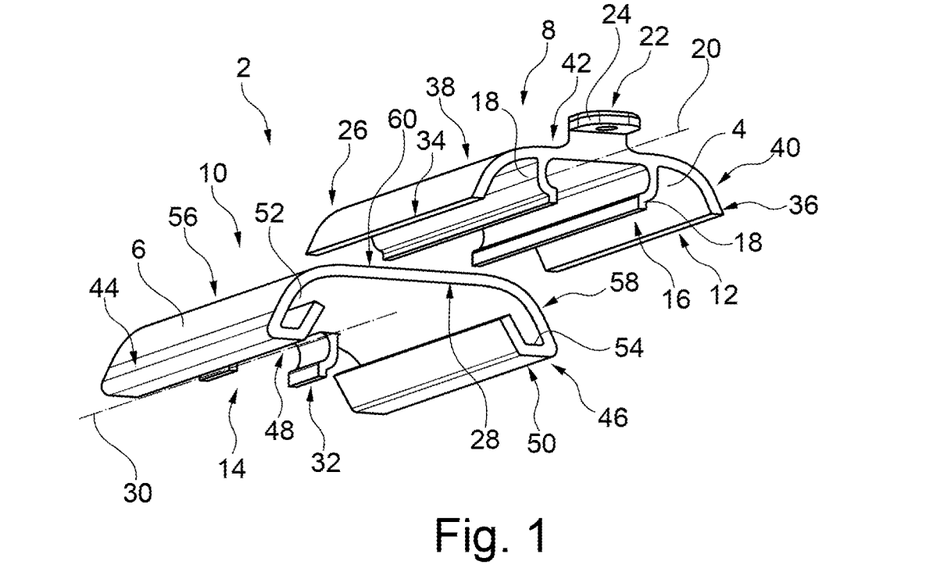
FIG. 1 shows a rail covering in the form of two covering elements in a three-dimensional illustration as seen from a lower side.

FIG. 1 shows a rail covering 2 for a sliding seat rail (not shown in this illustration). The rail covering 2 has a first elongate covering element 4 and a second elongate covering element 6. The two covering elements 4 and 6 have an upper side 8 and 10 and a lower side 12 and 14, respectively.

Virtually over its entire length on the lower side, the first covering element 4 has a first guide means 16 which is designed in the form of two web-like, spaced-apart projections 18. The two projections 18 run parallel to a longitudinal axis 20 and are of mirror-symmetrical design. Regions of the projections 18 that face the upper side 8 of the first covering element 4 are outwardly curved transversely with respect to the longitudinal axis 20.

In addition, the first covering element 4 has a first fastening end 22 on which a flange 24 is positioned, the flange facing away from the lower side 12. The flange serves to connect the first covering element 4 to a structural element to be displaced, for example a seat frame of a passenger seat device. A first free end 26 which does not contain any fastening element or the like is arranged at the opposite end along the longitudinal axis 20. The free end serves later to be pushed into the second covering element 6.

The second covering element 6 has an open end 28 which is arranged on the end side and is also called below a second push-in end 28 into which the first free end 26 can be pushed. At the opposite end of the second covering element 6 along a longitudinal axis 30, the second guide means 32, the configuration of which resembles that of the first guide element 16, is located on the lower side 14. However, the second guide element 32 extends over a significantly shorter distance along the longitudinal axis 30 and is concentrated on the end lying opposite the second push-in end 28. The extent of the second guide element 32 could be limited to a length which corresponds to approximately 10% to 25% of the extent of the lower side 14 of the second covering element 6.

A profile cross section of the first covering element 4 substantially has a bell or hood shape. The first covering element has two outer longitudinal edges 34 and 36 which run parallel to each other and enclose the longitudinal axis 20. Two curved limbs 38 and 40, which, for example, could each have the shape of a quarter circle, are arranged between the two longitudinal edges 34 and 36, which could be provided for resting on a floor. A flat web 42 is connected therebetween, the web complementing the two webs 38 and 40 continuously and subsequently being oriented parallel to the floor.

The shape of the second covering element 6 is very similar, however, two longitudinal edges 44 and 46 here have a fold 48 and 50, respectively, on the inner side, the folds each forming a gap 52 and 54 from the adjacent limb 56 and 58, respectively. The gaps 52 and 54 are dimensioned in such a manner that the first free end 26 of the first covering element 4 can be pushed in there. A flat web 60 is arranged analogously to the first covering element 4 between the limbs 56 and 58 and is subsequently, i.e., during use, oriented parallel to a floor bearing the sliding seat rail. It goes without saying that, for the pushing of the first covering element 4 into the second covering element 6, the latter has to be of somewhat larger dimension than the first covering element 4. The extent in the vertical and lateral direction of the second covering element 6 should therefore additionally have at least double the wall thickness of the first covering element 4.

Figure 2:
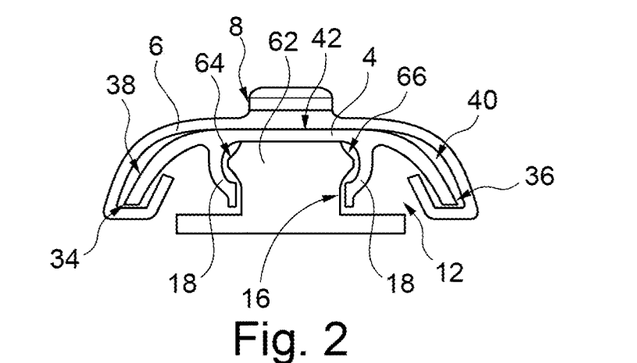
FIGS. 2 and 3 show the first covering element and the second covering element on a sliding seat rail in a front view.

FIG. 2 shows the first covering element 4 which is placed onto a sliding seat rail 62 which has a main direction of extent x. The covering elements 4 and 6 are placed on the sliding seat rail 62 in such a manner that the longitudinal axes 20 and 30 lie parallel to the main direction of extent x. The sliding seat rail 62 has, by way of example, two longitudinal sides 64 and 66 which have bulges and with respect to which the projections 18 are correspondingly configured. Consequently, the first covering element 4 can be pushed onto the sliding seat rail 62, and, therefore, the first covering element 4 can always be displaced precisely on the sliding seat rail 62 irrespective of other fixtures.

Figure 3:
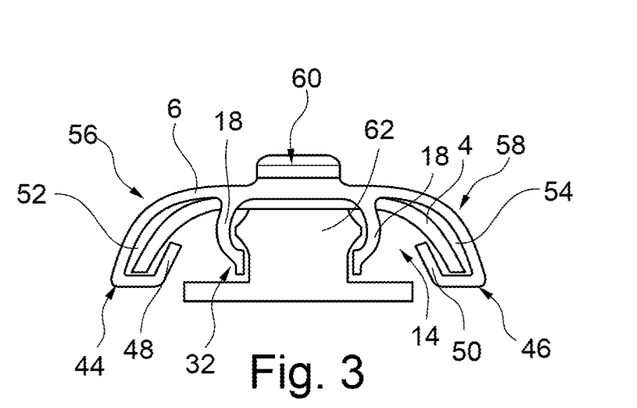

FIG. 3 shows the corresponding design of the second covering element 6, the second guide means 32 of which is pushed onto the sliding seat rail 62 such that the second covering element 6 can also be precisely guided along the sliding seat rail 62 irrespective of other fixtures. In an overall view of FIGS. 1, 2 and 3, it therefore becomes clear that the first covering element 4 can easily be pushed into the second covering element 6 as far as a state in which the first free end 26 butts against the second guide means 32 on the lower side 14. The second guide means 32 can therefore also be a stop for the first covering element 4.

The first covering element 4 can equally be disengaged from the second covering element 6 when two passenger seats which are arranged one behind the other, and to which the rail covering 2 is coupled, are pushed apart. However, the covering element 4 is then precisely guided along the sliding seat rail 62 by the first guide means 16 and always maintains the designated orientation with respect to the sliding seat rail 62. When the passenger seats and therefore the two covering elements 4 and 6 are pushed onto one another again, the first covering element 4 can consequently be readily precisely introduced into the second covering element 6, which is also oriented on the sliding seat rail 62.

Figure 4:
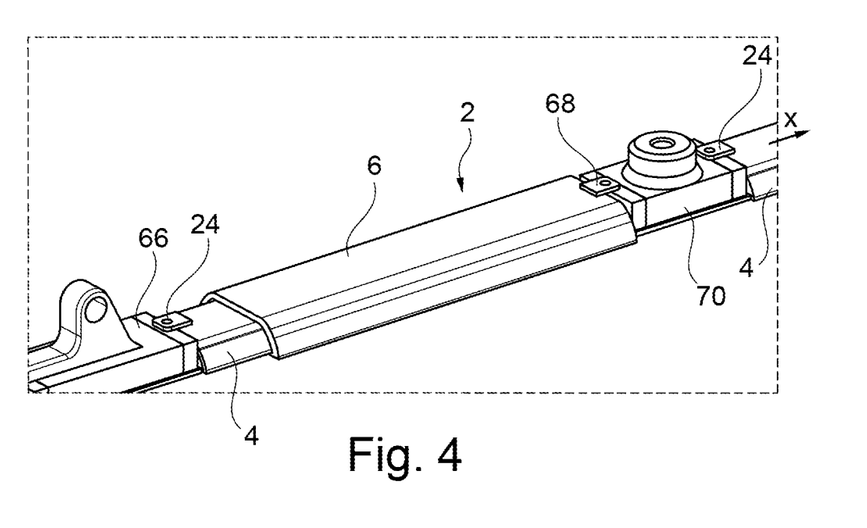
FIG. 4 shows the rail covering in a three-dimensional illustration on a sliding seat rail.

FIG. 4 shows the rail covering 2 in an installed state. A first fastening element 66, which is arranged on the sliding seat rail 62 and is part of a fitted element, is shown by way of example. The first covering element 4 is connected to the fastening element by means of the flange 24 and extends into the second covering element 6. The latter furthermore likewise has a flange 68 which is connected to a second fastening element 70 and is likewise arranged on the sliding seat rail 62 and is part of a fitted element. If the two fastening elements 66 and 70 are displaced relative to each other, the length of the rail covering 2 is consequently changed.

Figure 5:
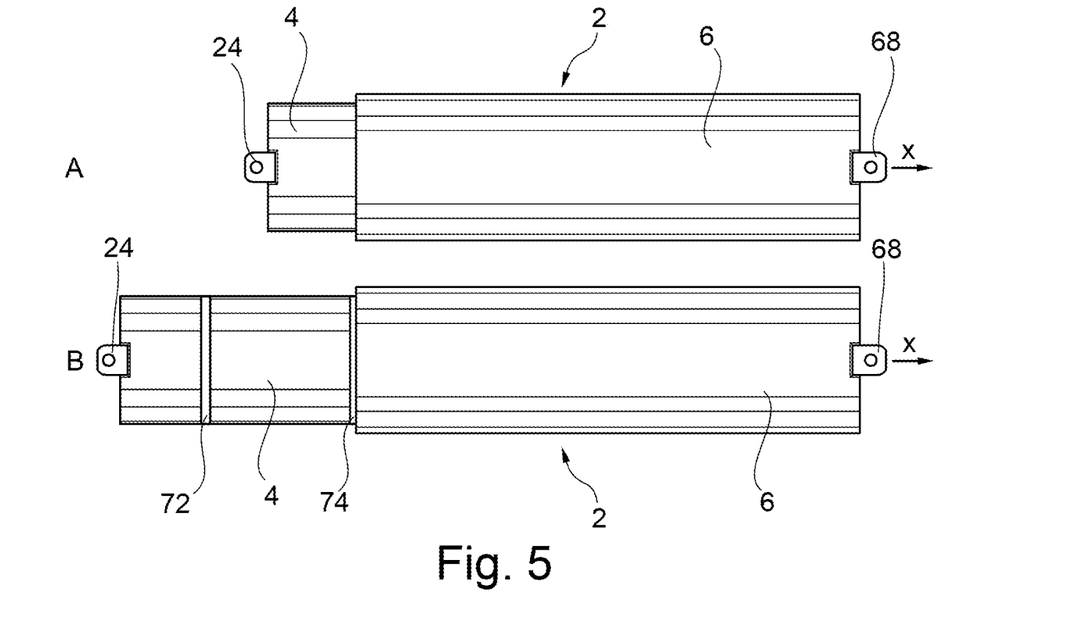
FIG. 5 shows two different lengths of the rail covering for realizing two different seat distances.

This is illustrated in FIG. 5. In a state labelled with A, the rail covering 2 is comparatively short, i.e., the required length of the rail covering 2 is small because of a reduced seat distance between two passenger seats. In the state labelled with B, the length of the rail covering 2 is however relatively large.

It is furthermore shown in this variant that the first covering element 4 can be provided with markings 72 and 74 which indicate to a user a plurality of predetermined seat distances in a visually easily identifiable manner. Space which is used for advertising can furthermore be provided between the markings 72 and 74.

Figure 6A:
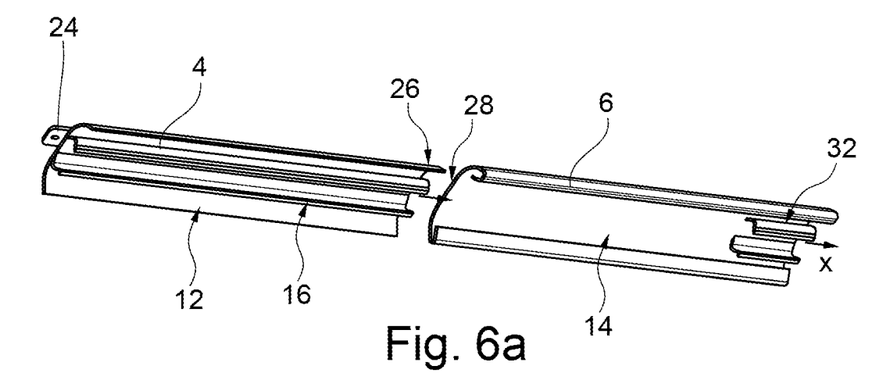
FIGS. 6a to 6e show the successive pushing on of the first covering element into the second covering element.

FIGS. 6a to 6e show successively a pushing-in operation. In FIG. 6a, the first covering element 4 is at a significant distance from the second covering element 6, but is spatially precisely oriented on the sliding seat rail 62 by the first guide means 16. The same is true for the second covering element 6 which is also oriented on the sliding seat rail 62 with the second guide means 32. During a pushing-on movement, the first free end 26 is therefore guided very precisely into the push-in end 28.

Figure 6B:
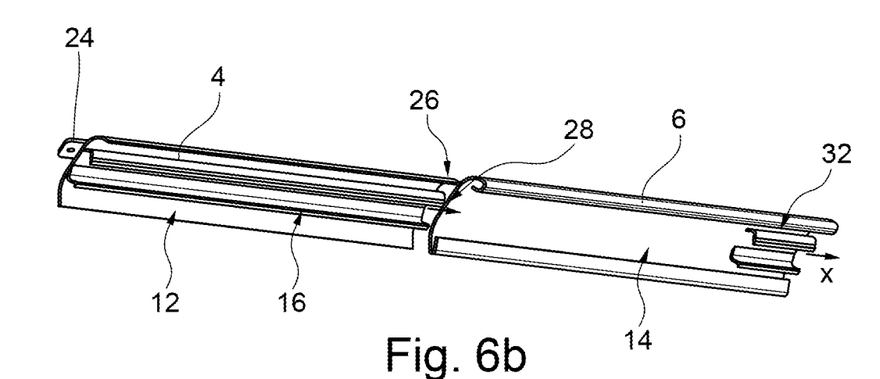
Figure 6C:
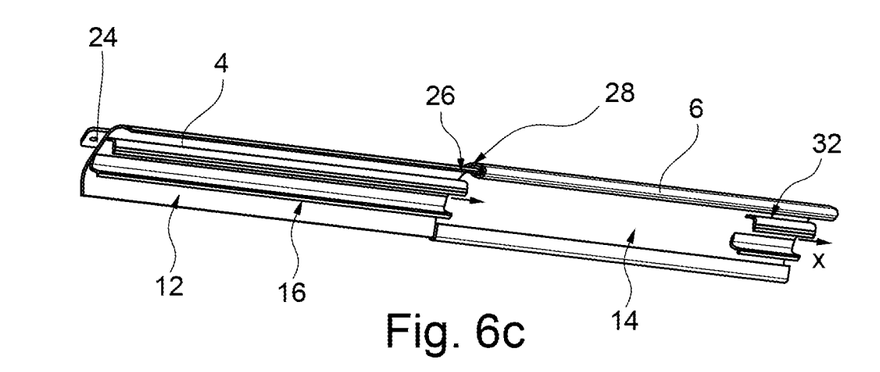

FIG. 6b shows a significant approach of the first free end 26 and the push-in end 28, which leads, in FIG. 6c, to the free end 26 being inserted into the push-in end 28.

Figure 6D:
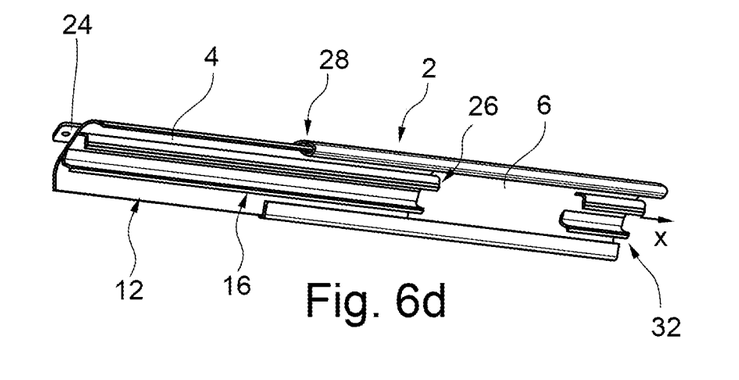
Figure 6E:
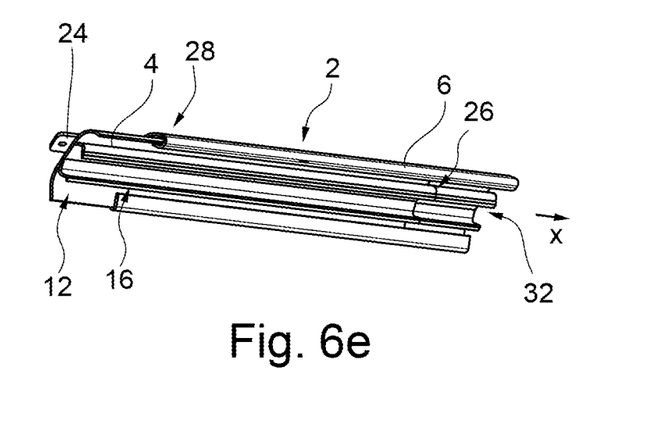

The following illustrations in FIGS. 6d and 6e clarify the suitability of the rail covering 2 for taking up different lengths. In FIG. 6E, the first free end 26 butts against the second guide means 32, and therefore the shortest possible length is achieved here.

Figure 7:
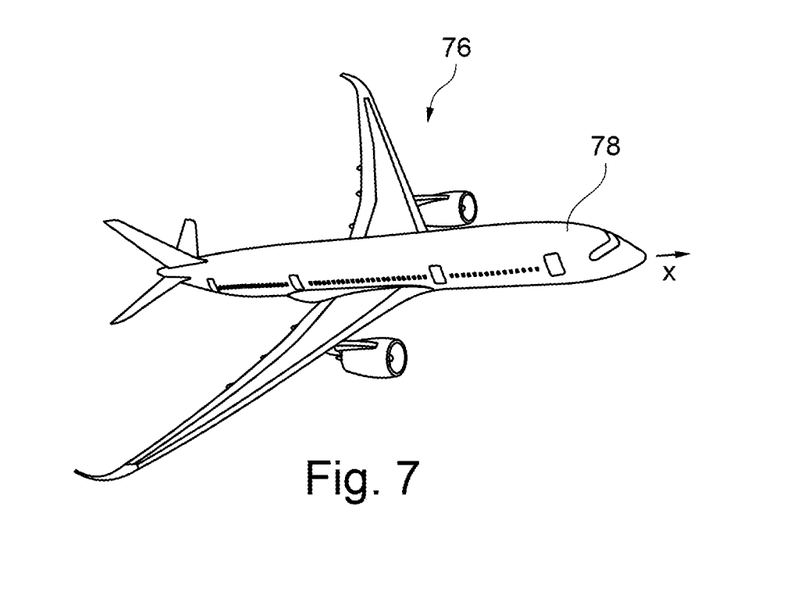
FIG. 7 shows an aircraft with a cabin and a sliding seat rail which is installed therein and is covered with a rail covering according to the invention.

Finally, FIG. 7 shows an aircraft 76 which is provided with a cabin 78 in which a passenger seat arrangement with at least two sliding seat rails 62 running parallel to one another is arranged. A rail covering 2 can be used there in order to protect the sliding seat rails 62 between two passenger seats arranged one behind the other from soiling and damage. The aircraft 76 has a longitudinal axis x which is parallel to the main direction of extent x of the sliding seat rail 62.

It is additionally noted that "having" does not rule out other elements or steps, and the words "a" or "an" do not rule out a multiplicity. It is also noted that features that have been described with reference to one of the above exemplary embodiments can also be used in combination with other features of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rail covering for a sliding seat rail between two passenger seats in a cabin of a vehicle, comprising:
    a first elongate covering element, and
    a second elongate covering element,
        the first covering element and the second covering element being formed in a complementary manner with respect to each other, such that the first covering element engages telescopically with a lower side of the second covering element,
        the first covering element having, at least in regions on a lower side, a first guide means which holds the first covering element on the sliding seat rail so as to be displaceable along a main direction of extent of the sliding seat rail, and
        the second covering element having an open end arranged on an end side and, at an end arranged oppositely on the end side on the lower side, having a second guide means which holds the second covering element on the sliding seat rail so as to be displaceable along the main direction of extent of the sliding seat rail.

2. The rail covering according to claim 1, wherein the first and second guide means comprise two spaced-apart projections which are arranged along a longitudinal axis of a relevant covering element.

3. The rail covering according to claim 2, wherein a distance of the projections from each other is variable, and wherein the projections have a bulge at least in regions transversely with respect to the longitudinal axis.

4. The rail covering according to claim 1, wherein the first covering element has a first bell-shaped or hood-shaped profile cross section which is formed perpendicularly to a longitudinal axis of said first covering element.

5. The rail covering according to claim 1,
    wherein the second covering element has a second bell-shaped or hood-shaped profile cross section which is formed perpendicularly to a longitudinal axis of said second covering element, and wherein longitudinal edges of the second profile cross section each have an inwardly directed fold which forms a gap for an insertion of the first covering element.

6. The rail covering according to claim 1, wherein the second guide means has an extent along the lower side of the second covering element, along a longitudinal axis thereof, said extent corresponding to at least one tenth of an extent of the second covering element along the longitudinal axis thereof.

7. The rail covering according to claim 6, wherein the extent of the second guide means corresponds at most to a quarter of the extent of the second covering element along the longitudinal axis thereof.

8. The rail covering according to claim 1, wherein the first guide means has an extent along the lower side of the first covering element along a longitudinal axis thereof, said extent substantially corresponding to the extent of the lower side of the first covering element along the longitudinal axis thereof.

9. The rail covering according to claim 1, wherein the first covering element and the second covering element each have a flange, which faces away from the lower side, for the fastening to a fitted element.

10. The rail covering according to claim 9, wherein the flange of the second covering element is arranged above the second guide means.

11. A passenger seat system for a cabin of a vehicle, comprising:
a plurality of passenger seat devices each having a seat frame, and
a rail system with at least two spaced-apart sliding seat rails running parallel to one another,
the seat frame having two pairs of spaced-apart seat legs each connected to a fastening element,
the fastening elements being in engagement with the sliding seat rails, and
the sliding seat rail between two passenger seat devices arranged one behind the other being covered with a rail covering according to claim 1.

12. A vehicle comprising:
a cabin,
a cabin floor, and
a passenger seat system according to claim 11.

* * * * *